US012781804B2

(12) United States Patent
Wang et al.

(10) Patent No.: US 12,781,804 B2
(45) Date of Patent: Nov. 3, 2026

(54) INTELLIGENT BEARING AND METHOD FOR DETECTING OPERATION STATE OF INTELLIGENT BEARING

(71) Applicant: TSINGHUA UNIVERSITY, Beijing (CN)

(72) Inventors: Song Wang, Beijing (CN); Jigang Feng, Beijing (CN); Qinkai Han, Beijing (CN); Shuai Gao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 80 days.

(21) Appl. No.: 19/024,876

(22) Filed: Jan. 16, 2025

(65) Prior Publication Data

US 2025/0237267 A1 Jul. 24, 2025

(30) Foreign Application Priority Data

Jan. 23, 2024 (CN) ........................ 202410096089.X

(51) Int. Cl.
*F16C 41/00* (2006.01)
*H02N 1/04* (2006.01)

(52) U.S. Cl.
CPC ........ *F16C 41/004* (2013.01); *F16C 2233/00* (2013.01); *H02N 1/04* (2013.01)

(58) Field of Classification Search
CPC ... F16C 41/004; F16C 41/008; F16C 2233/00
See application file for complete search history.

(56) References Cited

U.S. PATENT DOCUMENTS 7,780,357 B2 * 8/2010 Varonis ................. F16C 41/007
384/445
12,435,759 B2 * 10/2025 Koike ................... F16C 41/007

FOREIGN PATENT DOCUMENTS

CN 113175482 A * 7/2021 ............... H02N 1/04

OTHER PUBLICATIONS

Translation of CN113175482 obtained Jun. 2, 2026.*

* cited by examiner

*Primary Examiner* — James Pilkington
(74) *Attorney, Agent, or Firm* — Hodgson Russ LLP

(57) ABSTRACT

An intelligent bearing includes a bearing body and a detection component. The bearing body includes an inner ring, an outer ring, a rolling body and a cage, and the detection component includes a conductive layer and friction layers. The inner ring is rotatably fixed within the outer ring and spaced apart from the outer ring. The cage is rotatably disposed between the inner ring and the outer ring. The rolling element is rotatably disposed in the cage. The friction layers are arranged at intervals between the inner ring and the outer ring. The conductive layer is attached to a first protrusion of the cage protruding toward the friction layer, rotates with the cage between the inner ring and the outer ring, and contacts and rubs against the friction layers fixed between the inner ring and the outer ring, to form a tribovoltaic effect and generates a direct current.

20 Claims, 7 Drawing Sheets

INTELLIGENT BEARING AND METHOD FOR DETECTING OPERATION STATE OF INTELLIGENT BEARING

CROSS-REFERENCE TO RELATED APPLICATIONS

This application claims priority to Chinese Patent Application No. 202410096089.X, filed on Jan. 23, 2024, the entire disclosure of which is hereby incorporated herein by reference.

TECHNICAL FIELD

The present disclosure relates to the field of intelligent bearing technologies, and in particular, to an intelligent bearing and a method for detecting an operating state of an intelligent bearing.

BACKGROUND

As a key basic component of machinery, a rolling bearing is widely used in a modern industrial equipment, such as a motor, a machine tool, an aerospace, etc. An operating state of the rolling bearing directly affects the working performance, reliability and life of the system equipment. Since a working face of the rolling bearing is easily damaged under repeated action of long-term contact stress, it will cause a transmission system to fail or even cause serious failures. Therefore, a research on rolling bearing fault diagnosis is of great significance to improving equipment reliability and economic benefits.

In related art, in order to detect the operating state of the rolling bearing, a sensor is usually installed on the rolling bearing to detect and analyze a vibration, a temperature and other parameters of the rolling bearing. However, the sensor can only be installed in a place such as a bearing seat, that is, an installation position of the sensor on the rolling bearing is limited, resulting in serious noise interference on the sensor signal, and poor detection and diagnosis accuracy. Further, the existing sensor usually does not have self-power and self-diagnosis characteristics, making it difficult to actively identify a fault characteristic of the rolling bearing, and thus the detection and diagnosis efficiency is low.

SUMMARY

A first aspect of embodiments of the present disclosure proposes an intelligent bearing. The method includes:

a bearing body, the bearing body including an inner ring, an outer ring, a rolling element and a cage, the inner ring being rotatably fixed within the outer ring and spaced apart from the outer ring, the cage being rotatably disposed between the inner ring and the outer ring, and the rolling element being rotatably disposed in the cage and located between the inner ring and the outer ring; and a detection component, the detection component including a conductive layer and a plurality of friction layers, the plurality of the friction layers being arranged around and at intervals between the inner ring and the outer ring, and the conductive layer being attached to a first protrusion of the cage protruding toward a side of the friction layers;

in which when the cage rotates with the rolling element, the conductive layer rotates with the cage, and generates a direct current by converting mechanical energy of the rolling element into electrical energy when the conductive layer contacts and rubs against the friction layers.

A second aspect of embodiments of the present disclosure provides a method for detecting an operating state of an intelligent bearing. The method includes:

using an intelligent bearing including a bearing body and a detection component, the bearing body including an inner ring, an outer ring, a rolling element and a cage, and the detection component including a conductive layer and a plurality of friction layers; in which the inner ring is rotatably fixed within the outer ring and spaced apart from the outer ring, the cage is rotatably disposed between the inner ring and the outer ring, and rolling element is rotatably disposed in the cage and located between the inner ring and the outer ring, the plurality of the friction layers are arranged around and at intervals between the inner ring and the outer ring, and the conductive layer is attached to a first protrusion of the cage protruding toward a side of the friction layers; in which when the cage rotates with the rolling element, the conductive layer rotates with the cage, and generates a direct current by converting mechanical energy of the rolling element into electrical energy when the conductive layer contacts and rubs against the friction layers;

obtaining a theoretical rotation frequency of the cage based on a specification parameter of the bearing body and a rotation frequency of the inner ring;

obtaining an actual rotation frequency of the cage based on a characteristic frequency of the direct current generated by the detection component; and determining whether the cage is slipping based on the theoretical rotation frequency and the actual rotation frequency of the cage.

Additional aspects and advantages of the present disclosure will be given in part in the following descriptions, become apparent in part from the following descriptions, or be learned from the practice of the disclosure.

BRIEF DESCRIPTION OF THE DRAWINGS

The above and/or additional aspects and advantages of the present disclosure will become apparent and easily understood from the following description of embodiments in conjunction with the accompanying drawings, in which.

100 bearing body; 110 outer ring; 120 inner ring; 130 rolling element; 140 cage; 141 first protrusion; 150 dust cover; 200 detection component; 210 conductive layer; 220 friction layer; 221 N-type semiconductor layer; 2211 first electrode; 222 P-type semiconductor layer; 2221 second electrode; 230 support plate; 240 end cover; 241 positioning ring; 2401 first surface; 2402 second surface; 250 strong magnet.

DETAILED DESCRIPTION

Embodiments of the present disclosure are described in detail below, and examples of which are shown in the accompanying drawings, in which the same or similar symbols throughout represent the same or similar elements or elements having the same or similar functions. The embodiments described below with reference to the accompanying drawings are exemplary, and they are used to explain the disclosure and are not to be construed as limiting the disclosure.

Figure 1:
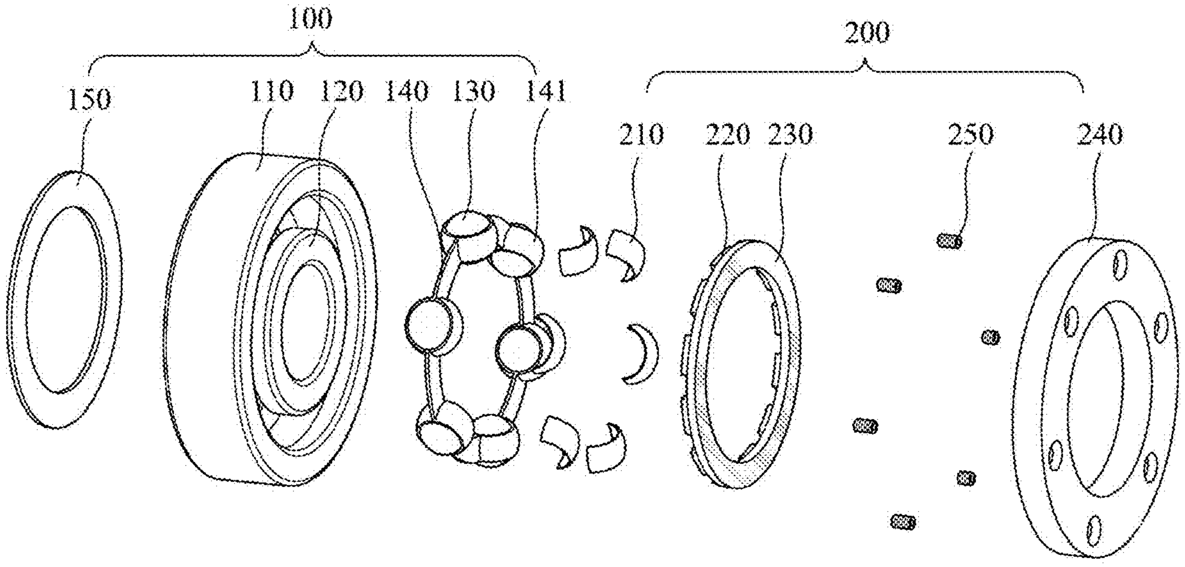
FIG. 1 is an exploded view of an intelligent bearing according to an embodiment of the present disclosure.
Figure 2:
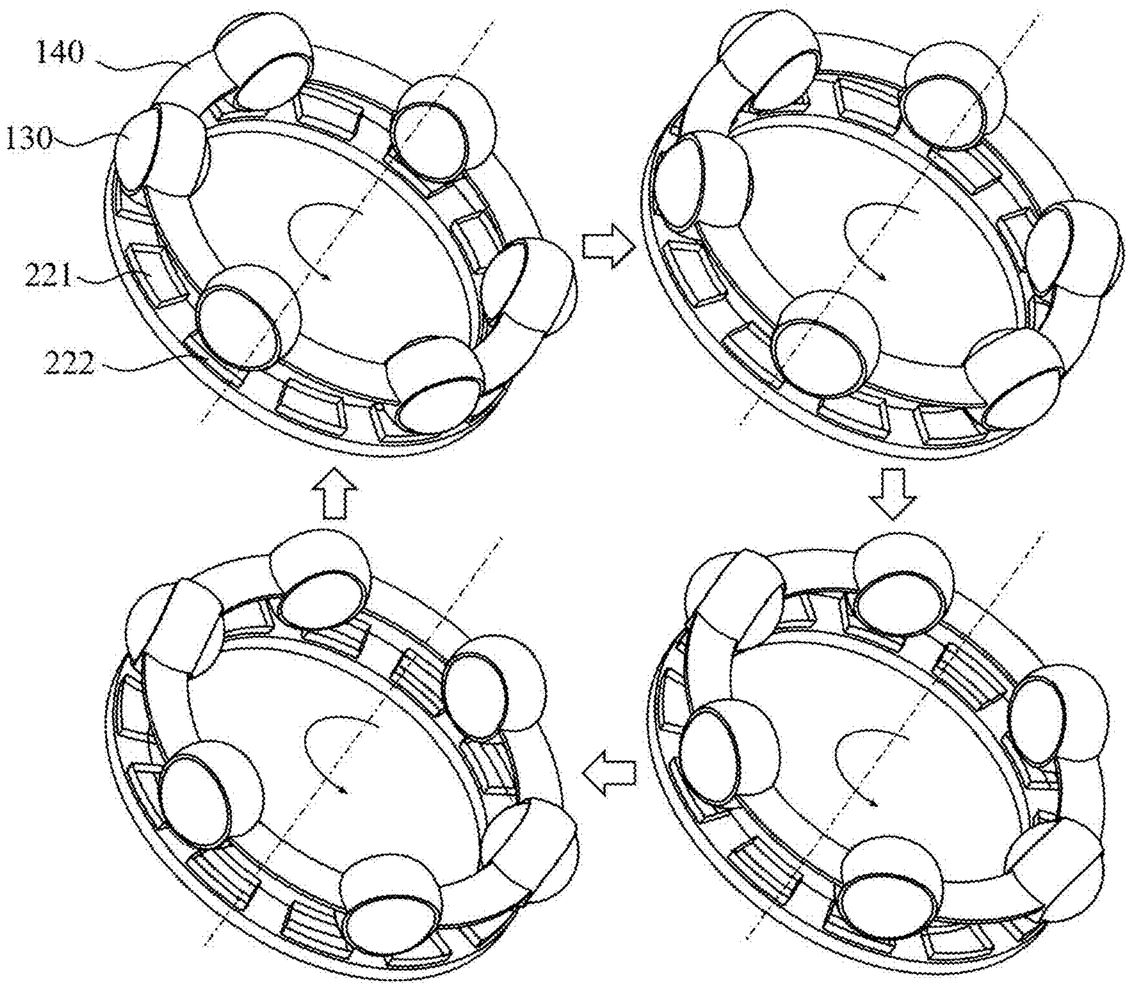
FIG. 2 is a schematic diagram showing an operation of an intelligent bearing according to an embodiment of the present disclosure.
Figure 3:
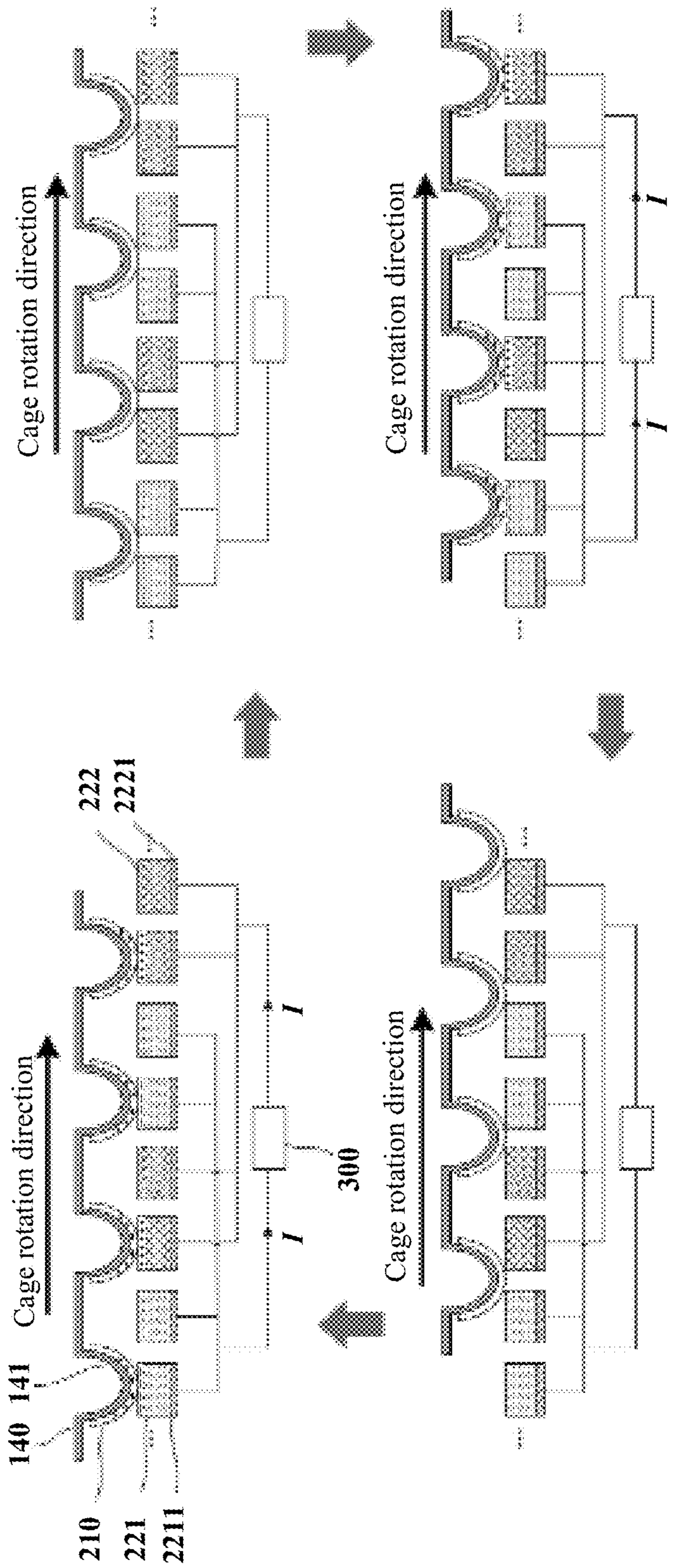
FIG. 3 is a schematic diagram showing an operation of an intelligent bearing according to an embodiment of the present disclosure.

In a first aspect, an embodiment of the present disclosure provides an intelligent bearing, as shown in FIGS. 1 to 3, the intelligent bearing includes a bearing body 100 and a detection component 200.

The bearing body 100 includes an inner ring 120, an outer ring 110, a rolling element 130 and a cage 140. The inner ring 120 is rotatably fixed within the outer ring 110 and spaced apart from the outer ring 110. The cage 140 is rotatably disposed between the inner ring 120 and the outer ring 110. The rolling element 130 is rotatably disposed in the cage 140 and is located between the inner ring 120 and the outer ring 110, such that when the inner ring 120 and the outer ring 110 rotate relative to each other, the rolling element 130 is driven to rotate between the inner ring 120 and the outer ring 110, thereby causing the cage 140 to rotate between the inner ring 120 and the outer ring 110 along with the rolling element 130.

The detection component 200 includes a conductive layer 210 and a plurality of friction layers 220. The plurality of friction layers 220 are arranged around and at intervals between the inner ring 120 and the outer ring 110. The conductive layer 210 is attached to a side of the cage 140 facing the friction layer 220, so that the conductive layer 210 may rotate with the cage 140 between the inner ring 120 and the outer ring 110, and contacts and rubs against the friction layer 220 to form sliding friction.

The cage 140 is a wave-shaped cage 140, and has a plurality of first protrusions 141 protruding toward the friction layers 220. The conductive layer 210 is mounted on a first protrusion 141 so that during the rotation of the cage 140, the conductive layer 210 may rub against the friction layer 220 to form sliding friction.

The above-mentioned intelligent bearing is configured such that when the cage 140 rotates with the rolling element 130, the conductive layer 210 is able to rotate with the cage 140, and contacts and rubs against the friction layer 220 to form a tribovoltaic effect, which converts mechanical energy of the rolling element 130 into electrical energy to generate a direct current. In other words, the present disclosure uses the tribovoltaic effect to make the conductive layer 210 contact and rub against different friction layers 220 to control a flow direction of charge carriers during the friction process, so as to generate and output the direct current between different friction layers 220. It realizes the integrated combination of intelligent sensing and a traditional bearing, and has the characteristics of low processing and manufacturing cost, simple and compact structure, and providing stable and adjustable electric signals.

At the same time, compared with a traditional friction nanogenerator, the intelligent bearing in the present disclosure does not need to use polymer materials to participate in friction power generation, and have a wider range of applications. The current generated based on the tribovoltaic effect is the direct current, which does not require to be processed by a rectifier circuit and has a higher current density, and can realize self-powered intelligent sensing of the rolling bearing.

In addition, the present disclosure is based on a real-time electrical signal parameter of the direct current output by the friction layers 220, that is, it can obtain the actual rotation parameter of the rotation of the cage 140 relative to the friction layers 220, thereby realizing the real-time monitoring of the operating state of the intelligent bearing.

As shown in FIG. 1, in some embodiments, the conductive layer 210 is composed of a conductive film with elastic recovery ability, and needs to have sufficient elastic recovery ability such that when the conductive layer 210 and the friction layer 220 are contacting and rubbing against each other, the elastic recovery ability of the conductive layer 210 may reduce compression to the friction layer 220 by the cage 140 during the engagement process, thereby improving the durability of the detection component 200.

At the same time, the conductive layer 210 is also required to have excellent conductivity, so that when the conductive layer 210 and the friction layer 220 are contacting and rubbing against each other, induced charges are able to flow between the conductive layer 210 and the friction layer 220 to generate the direct current. The excellent conductivity of the conductive layer 210 can improve the stability of the flow of the induced charges, thereby improving the stability of the direct current output.

Exemplarily, the conductive layer 210 is a copper foam with thickness ranging from 0.8 mm to 1.5 mm, and the specific thickness may be 1 mm or 1.2 mm.

It should be noted that the conductive layer 210 includes but is not limited to foam copper, and may be a conductor layer or a semiconductor layer. The present disclosure does not specifically limit the specific material of the conductive layer 210.

In some embodiments, there are a plurality of conductive layers 210, which are arranged at intervals from each other and correspond one-to-one to the first protrusions 141. Therefore, during the rotation of the cage 140, each conductive layer 210 may cyclically contact and rub against the friction layers 220 at different positions to achieve the migration of the induced charges generated in the conductive layer 210.

As shown in FIGS. 2 and 3, in some embodiments, friction layers 220 include N-type semiconductor layers 221 and P-type semiconductor layers 222 that are arranged at intervals, and a Fermi level of the conductive layer 210 is between a Fermi level of a P-type semiconductor layer 222 and a Fermi level of an N-type semiconductor layer 221.

Since the Fermi level of the N-type semiconductor layer 221 is higher than the Fermi level of the conductive layer 210, when the conductive layer 210 and the N-type semiconductor layer 221 contact and rub against each other, electrons in the N-type semiconductor layer 221 flow toward the conductive layer 210, making a surface of the N-type semiconductor layer 221 positively charged. At this time, a direction of a built-in electric field is from the N-type semiconductor layer 221 to the conductive layer 210 in contact with it.

Similarly, since the Fermi level of the P-type semiconductor layer 222 is lower than the Fermi level of the conductive layer 210, when the conductive layer 210 and the P-type semiconductor layer 222 contact and rub against each other, electrons in the conductive layer 210 flow toward the P-type semiconductor layer 222, making a surface of the P-type semiconductor layer 222 negatively charged. At this time, a direction of the built-in electric field is from the conductive layer 210 to the P-type semiconductor layer 222 in contact with it.

According to the tribovoltaic effect, the built-in electric field dominates a transport of the charge carriers, so that an electron-hole pair at the friction surface generates the direct current under the drive of the built-in electric field, and the direction of the direct current is consistent with the direction of the built-in electric field, and is independent of the friction direction. Therefore, when a first electrode 2211 is set at the bottom of the N-type semiconductor layer 221, a second electrode 2221 is set at the bottom of the P-type semiconductor layer 222, and the first electrode 2211 and the second electrode 2221 are electrically connected to two ends of an external load through wires, the direct current can be generated between the first electrode 2211 and the second electrode 2221, directing from the second electrode 2221 to the first electrode 2211.

Furthermore, since the friction layers 220 are disposed between the inner ring 120 and the outer ring 110 in a mutually spaced manner, the P-type semiconductor layer 222 and the N-type semiconductor layer 221 are also disposed between the inner ring 120 and the outer ring 110 in a mutually spaced manner. When the conductive layers 210 are located at the intervals between the adjacent friction layers 220, the conductive layers 210 do not contact any friction layer 220, and thus do not form the tribovoltaic effect, and the P-type semiconductor layer 222 and the N-type semiconductor layer 221 do not generate the current. As a result, during the rotation of the cage 140, the conductive layers 210 may switch between three states of contact-friction-separation with the friction layers 220 as the cage 140 rotates, and thus a periodic direct current is generated between the first electrode 2211 and the second electrode 2221, directing from the second electrode 2221 to the first electrode 2211.

The external load may be a direct current signal acquisition module having functions such as signal acquisition, filtering, analysis, and storage, to extract characteristic parameters of the direct current output by the intelligent bearing. The bottom of the N-type semiconductor layer 221 and the bottom of the P-type semiconductor layer 222 are both on a side away from the conductive layers 210.

As an example, the N-type semiconductor layer 221 is an N-type doped silicon wafer, and the P-type semiconductor layer 222 is a P-type doped silicon wafer, and their thickness ranges from 600 μm to 1000 μm, and may be 725 μm or 800 μm. The N-type semiconductor layer 221 may be a silicon wafer doped with any one or more dopants, such as P, As, Sb, etc., for providing electrons, and the P-type semiconductor layer 222 may be a silicon wafer doped with any one or more dopants, such as B, Ga, In, etc., for providing holes.

As an example, the first electrode 2211 and the second electrode 2221 are metal electrodes, which are made of a conductive metal material with thickness ranging from 50 nm to 200 nm, which may be 100 nm or 150 nm. The conductive material may be a conductive metal, such as Au, Ti, Ni, Al, Ag, Gr, Pt, etc., or their alloy material.

As shown in FIG. 2 to FIG. 5, in some embodiments, the number of friction layers 220 is an integer multiple of the number of conductive layers 210. Since the number of friction layers 220 is an integer multiple of the number of conductive layers 210, each conductive layer 210 may at least contact and rub against one friction layer 220 at the same time, and the more friction layers 220 there are, the higher a frequency of switching among the three states of contact-friction-separation between the conductive layer 210 and the friction layer 220 when the conductive layer 210 rotates with the cage 140, and the more the characteristic sensitivity (cycle frequency) of the direct current output by the detection component 200 may be increased, which is more conducive to the external load to analyze the characteristics of the direct current.

Furthermore, the number of N-type semiconductor layers 221 and the number of P-type semiconductor layers 222 may be the same or different. Since the friction layer 220 includes the N-type semiconductor layers 221 and the P-type semiconductor layers, and the different conductive layers 210 generate direct current by friction with the N-type semiconductor layers 221 and the P-type semiconductor layers 222, respectively, the more pairs of the N-type semiconductor layer 221 and the P-type semiconductor layer 222 are, the more conducive it is to improve the current density of the direct current.

Figure 5:
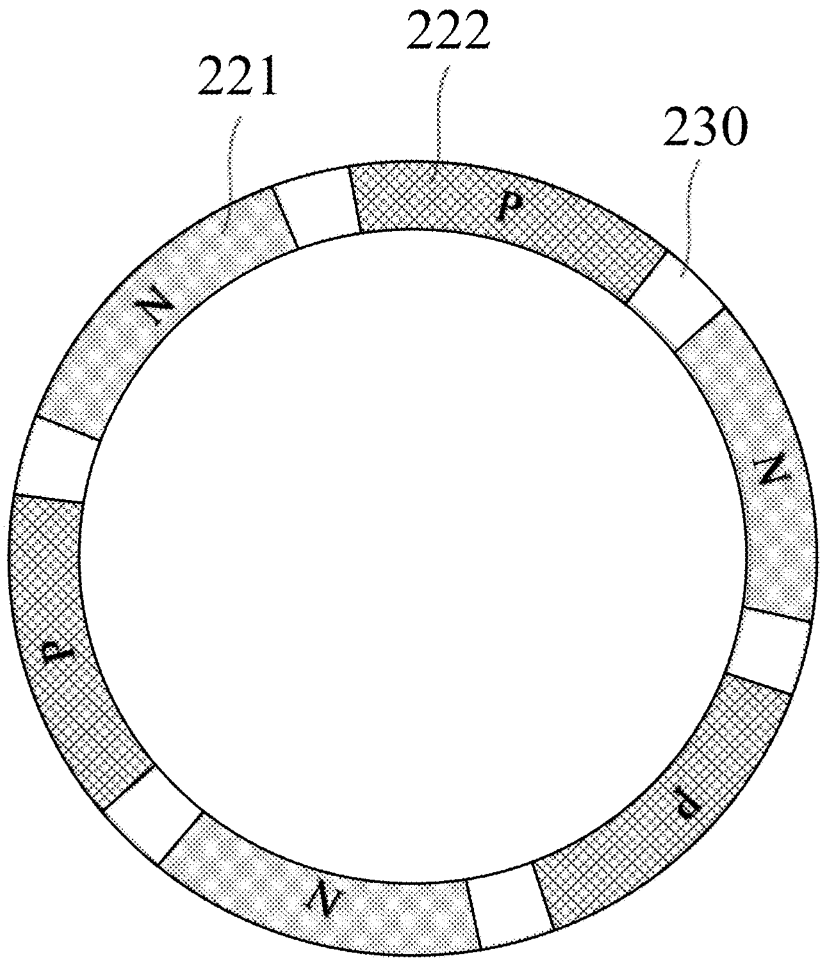
FIG. 5 is a schematic diagram showing a distribution of friction layers according to an embodiment of the present disclosure.

As an example, as shown in FIG. 5, the number of friction layers 220 is 6, and the number of conductive layers 210 is the same. The 6 friction layers 220 include 3 N-type semiconductor layers 221 and 3 P-type semiconductor layers 222, respectively, and the 3 N-type semiconductor layers and the 3 P-type semiconductor layers are sequentially arranged at intervals.

Figure 4:
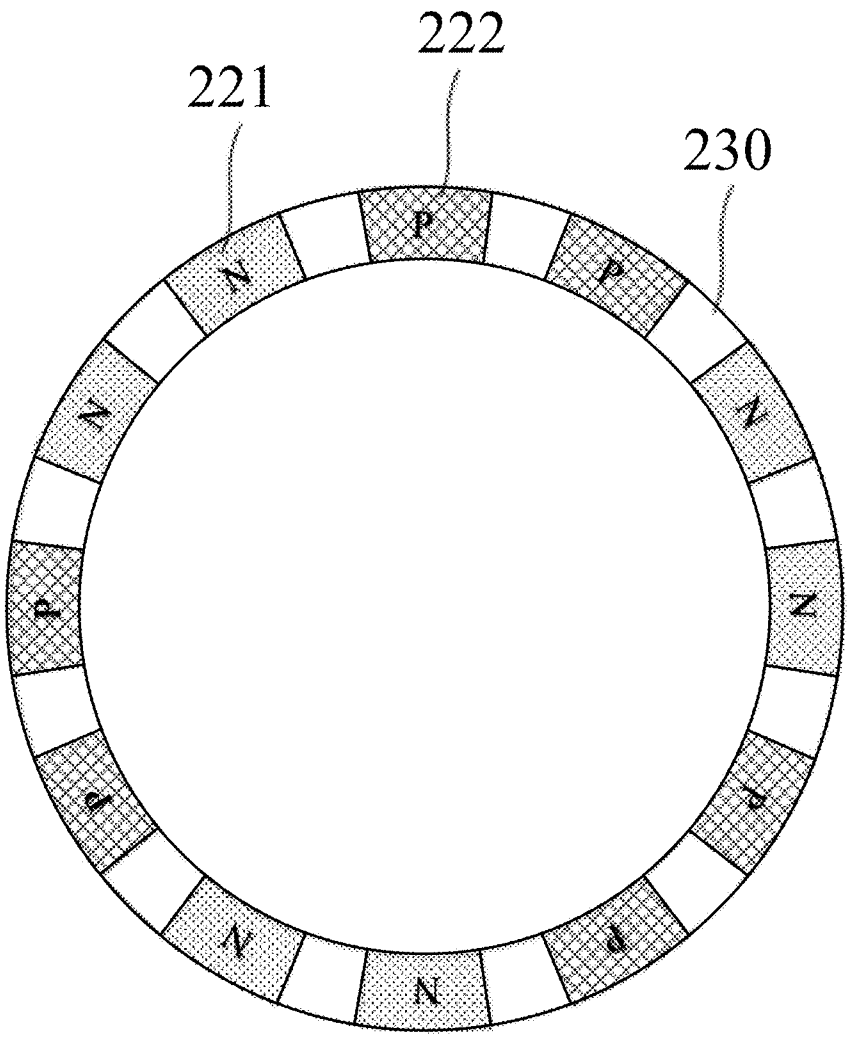
FIG. 4 is a schematic diagram showing a distribution of friction layers according to embodiment of the present disclosure.

As an example, as shown in FIG. 4, the number of friction layers 220 is 12, which is twice the number of conductive layers 210. The 12 friction layers 220 include 6 N-type semiconductor layers 221 and 6 P-type semiconductor layers 222, respectively, and for the 6 N-type semiconductor layers 221 and 6 P-type semiconductor layers 222, each pair of two N-type semiconductor layers 221 and each pair of two P-type semiconductor layers 222 are sequentially arranged at intervals.

As shown in FIG. 1, in some embodiments, the detection component 200 further includes a support plate 230 and an end cover 240. The end cover 240 is mounted on a side of the bearing body 100, fixedly connected to the side wall of the outer ring 110, and covers a gap between the inner ring 120 and the outer ring 110. The support plate 230 is arranged on a side of the end cover 240 facing the conductive layer 210, and the friction layers 220 are arranged on the support plate 230.

The end cover 240 covers the gap between the inner ring 120 and the outer ring 110, which may prevent external debris from entering the gap between the inner ring 120 and the outer ring 110 and affecting the normal rotation of the rolling element 130 or the cage 140, thereby protecting the bearing body 100. At the same time, by fixedly connecting the end cover 240 to the side wall of the outer ring 110, when the bearing body 100 is in operation, the end cover 240 may remain relative stillness with the outer ring 110, while the inner ring 120 and the cage 140 located between the inner ring 120 and the outer ring 110 may rotate relative to the end cover 240.

Therefore, the friction layer 220 is arranged on the side of the end cover 240 facing the conductive layer 210 through the support plate 230, so that the conductive layer 210 may rotate relative to the friction layer 220 when rotating with the cage 140. The support is arranged between the friction layer 220 and the end cover 240, which may not only provide bottom support for the friction layer 220, but also adjust a gap distance between the friction layer 220 and the conductive layer 210, so that the conductive layer 210 may contact and rub against the surface of the friction layer 220.

Figure 6:
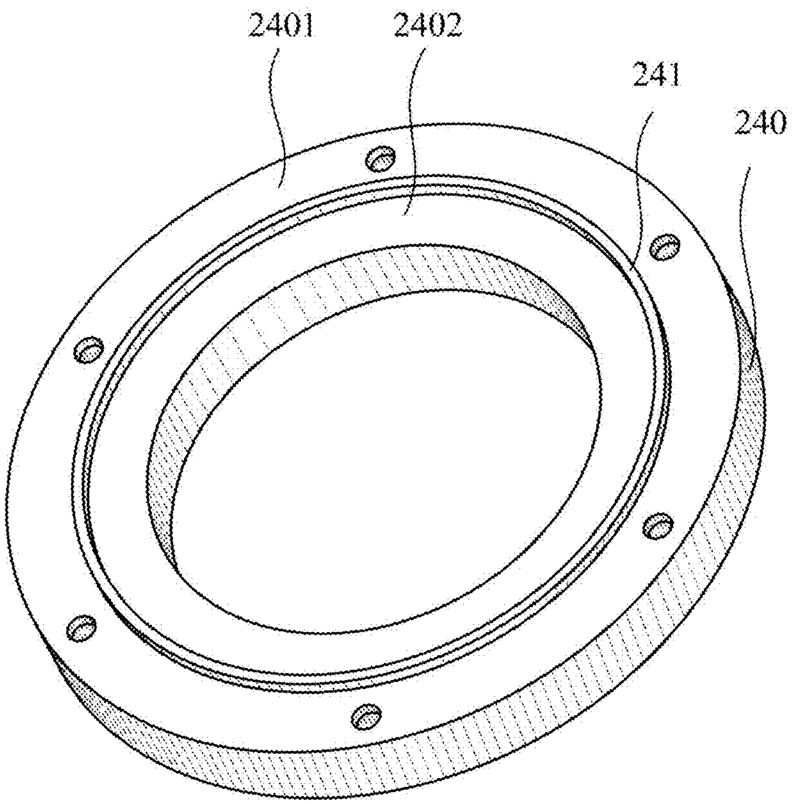
FIG. 6 is a schematic structural diagram of an end cover according to an embodiment of the present disclosure.
Figure 7:
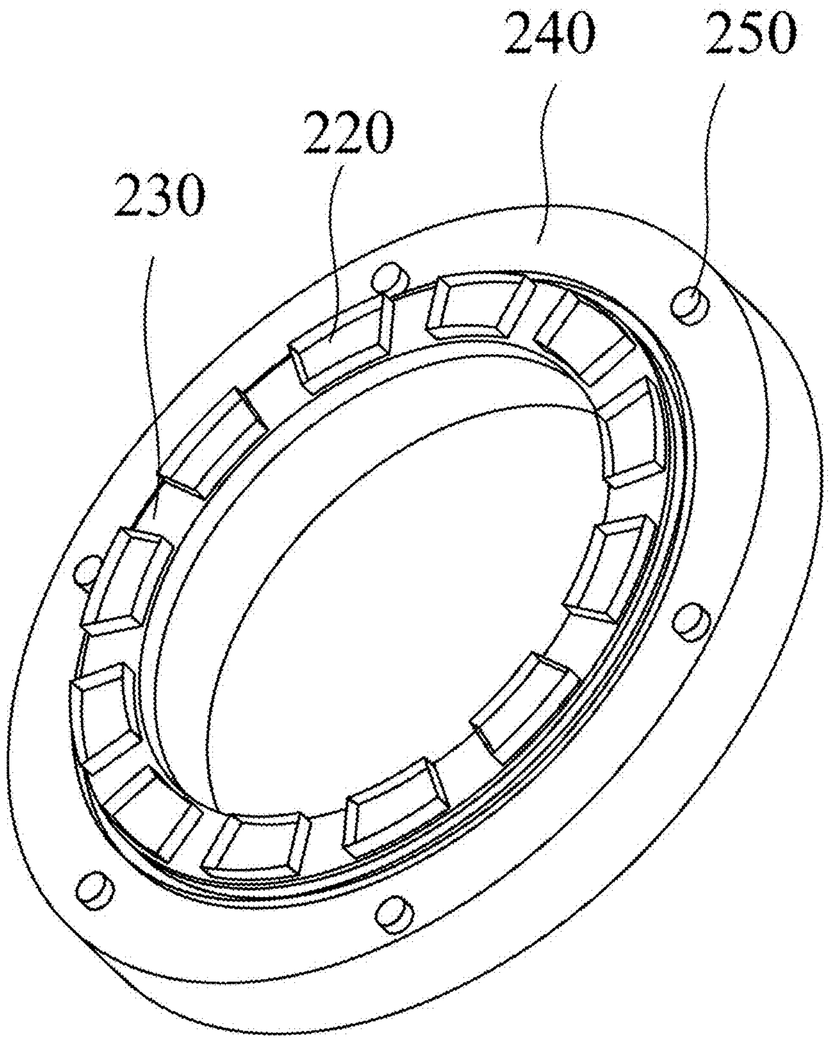
FIG. 7 is a schematic diagram of a structure of a detection component according to an embodiment of the present disclosure.

As shown in FIGS. 6 and 7, in some embodiments, a protruded positioning ring 241 is further provided on a surface of a side of the end cover 240 facing the bearing body 100. The positioning ring 241 and an inner wall of the outer ring 110 are in interference fit, to locate a specific mounting position of the end cover 240 on the bearing body 100, and to initially fix the end cover 240 on the side of the bearing body 100.

The positioning ring 241 also divides the surface of the side of the end cover 240 facing the bearing body 100 into a first surface 2401 and a second surface 2402, in which the first surface 2401 contacts with the side wall of the outer ring 110, and the second surface 2402 extends to cover the gap between the inner ring 120 and the outer ring 110, thereby protecting the bearing body 100.

Thus, by arranging the support plate 230 on the second surface 2402, that is, on a side of the positioning ring 241 close to an inner edge of the end cover 240, the friction layers 220 arranged on the support may contact and rub against the conductive layer 210 when the conductive layer 210 rotates with the cage 140. The distance between the friction layer 220 and the first protrusion 141 may be adjusted by thickness of the support plate 230. When the thickness of the support plate 230 is too small, the distance between the friction layer 220 and the first protrusion 141 is too large, which makes it difficult for the friction layer 220 to contact the conductive layer 210 mounted on the first protrusion 141, and thus the tribovoltaic effect cannot be formed. On the contrary, when the thickness of the support plate 230 is too large, the distance between the friction layer 220 and the first protrusion 141 is too small, which causes the friction layer 220 to be excessively compressed when the friction layer 220 contacts the conductive layer 210 mounted on the first protrusion 141, affecting the service life of the friction layers 220. Therefore, the specific subsequent configuration of the support plate 230 needs to be adaptively adjusted according to the distance between the friction layer 220 and the first protrusion 141.

As an example, the support plate 230 and the end cover 240 are both made of insulating materials, including but are not limited to resin materials, etc. The thickness of the end cover 240 is in a range of 2 mm to 3.5 mm.

Furthermore, a plurality of embedded strong magnets 250 are provided on the first surface 2401, so that when the first surface 2401 contacts with the side wall of the outer ring 110, the strong magnets 250 may be adsorbed on the side wall of the outer ring 110 to further fix the end cover 240 and the bearing body 100.

As an example, a plurality of grooves are evenly arranged on the first surface 2401, and the size and shape of the grooves are adapted to the size and shape of the strong magnets 250. One end of a strong magnet is embedded in the end cover 240 through a corresponding groove, and the other end protrudes from the first surface 2401, or is flush with the first surface 2401, so that when the first surface 2401 contacts with the side wall of one side of the outer ring 110, the strong magnet 250 may be adsorbed on the side wall of the outer ring 110.

As shown in FIG. 1, in some embodiments, the bearing body 100 also includes a dust cover 150, which is arranged on a side of the bearing body 100 away from the detection component 200, and is arranged opposite to the detection component 200, covering the gap between the inner ring 120 and the outer ring 110 on the opposite side to protect the rolling element 130 and the cage 140 inside the bearing body 100, thereby increasing the service life of the bearing body 100.

Figure 8:
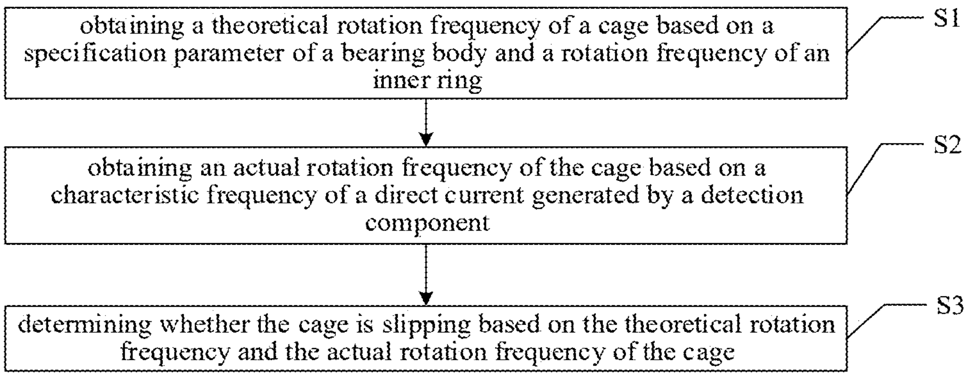
FIG. 8 is a flow chart of a method for detecting an operating state of an intelligent bearing according to an embodiment of the present disclosure.

In a second aspect, embodiments of the present disclosure further provide a method for detecting an operating state of an intelligent bearing, including using any of the above-mentioned intelligent bearings. As shown in FIG. 1 and FIG. 8, the method for detecting an operating state of an intelligent bearing includes the following steps:

- S1, obtaining a theoretical rotation frequency of a cage 140 based on a specification parameter of a bearing body 100 and a rotation frequency of an inner ring 120;
- S2, obtaining an actual rotation frequency of the cage 140 based on a characteristic frequency of a direct current generated by a detection component 200;
- S3, determining whether the cage 140 is slipping according to the theoretical rotation frequency and the actual rotation frequency of the cage 140.

In step S1, the theoretical rotation frequency of the cage 140 may be calculated according to the following formula (1):

$$f_1 = \frac{1}{2} f_0 \left(1 - \frac{d}{D} \cos\alpha\right) \tag{1}$$

where $f_1$ is the theoretical rotation frequency of the cage 140, $f_0$ is the actual rotation frequency of the inner ring 120, D is a pitch circle diameter of the bearing body 100, d is a diameter of the rolling element 130, and a is a contact angle.

In step S2, the actual rotation frequency of the cage 140 may be calculated according to the following formula (2):

$$f_v = C \cdot f_2 \tag{2}$$

where $f_v$ is the characteristic frequency of the direct current output by the detection component 200, C is the number of pairs of the P-type semiconductor layers 222 and the N-type semiconductor layers 221, and $f_2$ is the actual rotation frequency of the cage 140.

Therefore, through the above formula (1) and formula (2), the theoretical rotational frequency and actual rotational frequency of the intelligent bearing under the operating state can be calculated. When the actual rotational frequency of the cage 140 is basically consistent with the theoretical rotational frequency, it means that the current operating state of the intelligent bearing is normal. On the contrary, when the actual rotational frequency of the cage 140 is significantly lower than the theoretical rotational frequency, it means that the cage 140 is slipping and the current operating state of the intelligent bearing is abnormal. Once the cage 140 slips, the movement of the rolling element 130 is no longer pure rolling, resulting in the instability of the rolling bearing movement state, the long term operation of this rolling element 130 also leads to bearing failure and accidents. Therefore, monitoring the rotational frequency of the cage 140 is of great significance for determining whether the bearing body 100 can operate smoothly and reliably.

Furthermore, by further combining the electrical signal characteristic parameter of the direct current output by the detection component 200 with diagnostic methods such as deep learning, the operating state of the bearing body 100 may be directly determined, and the specific fault type can be classified and identified according to the electrical signal characteristic parameter of the direct current.

In summary, the present disclosure provides an intelligent bearing and a method for detecting its operating state. The intelligent bearing includes a bearing body 100 and a detection component 200. The bearing body 100 includes an inner ring 120, an outer ring 110, a rolling element 130 and a cage 140. The detection component 200 includes a conductive layer 210 and friction layers 220. The cage 140 is rotatably disposed between the inner ring 120 and the outer ring 110, and the conductive layer 210 is attached to a side of the cage 140 facing the friction layer 220, and can rotate with the cage 140 between the inner ring 120 and the outer ring 110, and contacts and rubs against the friction layer 220 that is also fixed between the inner ring 120 and the outer ring 110, to form a tribovoltaic effect and convert the mechanical energy of the rolling element 130 into electrical energy. The intelligent bearing has the characteristics of low processing and manufacturing cost, simple structure, and providing stable and adjustable electric signals.

The present disclosure also provides a method for detecting an operating state of an intelligent bearing, which can obtain the actual rotation parameter of the rotation of the cage 140 relative to the friction layers 220 based on the real-time electrical signal parameter of the electric energy output by the friction layers 220, thereby realizing real-time monitoring of the operating state of the intelligent bearing.

In the description of the embodiments of the present disclosure, the reference terms "an embodiment", "some embodiments", "example", "specific example", and "some examples" and the like are intended to describe specific features, structures, materials, or characteristics described in combination with the embodiment or example are included in at least one embodiment or example of the present disclosure. In the present disclosure, the schematic expressions of the above terms do not have to be directed to the same embodiments or examples. Moreover, the specific features, structures, materials, or characteristics described may be combined in a suitable manner in any one or more embodiments or examples. In addition, without contradicting each other, those skilled in the art may combine different embodiments or examples described in the present disclosure with features of different embodiments or examples.

In the description of the present disclosure, the terms "first" and "second" are used for descriptive purposes only, and are not to be construed as indicating or implying relative importance or implicitly indicating the number of technical features indicated. Therefore, the features including the terms "first" and "second" may explicitly or implicitly indicate at least one such feature. In the description of this disclosure, "a plurality of" means at least two, e.g., two and three, unless otherwise expressly and specifically limited.

What is claimed is:

1. An intelligent bearing, comprising:

a bearing body, the bearing body comprising an inner ring, an outer ring, a rolling element and a cage, the inner ring being rotatably fixed within the outer ring and spaced apart from the outer ring, the cage being rotatably disposed between the inner ring and the outer ring, and the rolling element being rotatably disposed in the cage and located between the inner ring and the outer ring; and a detection component, the detection component comprising a conductive layer and a plurality of friction layers, the plurality of friction layers being arranged at intervals around the intelligent bearing and between the inner ring and the outer ring, and the conductive layer being attached to a first protrusion of the cage protruding towards the plurality of friction layers;

wherein when the cage rotates with the rolling element the conductive layer rotates with the cage and generates a direct current by converting mechanical energy of the rolling element into electrical energy when the conductive layer contacts and rubs against the plurality of friction layers.

2. The intelligent bearing according to claim 1, wherein there are a plurality of conductive layers and a plurality of first protrusions, and the plurality of conductive layers are arranged at intervals from each other and correspond one-to-one to the plurality of first protrusions.

3. The intelligent bearing according to claim 1, wherein the plurality of friction layers comprise N-type semiconductor layers and P-type semiconductor layers that are arranged at intervals, and a Fermi level of the conductive layer is between a Fermi level of a P-type semiconductor layer and a Fermi level of an N-type semiconductor layer.

4. The intelligent bearing according to claim 3, wherein a number of the N-type semiconductor layers is the same as a number of the P-type semiconductor layers.

5. The intelligent bearing according to claim 3, wherein the plurality of friction layers further comprise first electrodes and second electrodes, the first electrodes are arranged on a side of the N-type semiconductor layer away from the conductive layer, the second electrodes are arranged on a side of the P-type semiconductor layer away from the conductive layer, and the first electrodes and the second electrodes are electrically connected to two ends of an external load respectively.

6. The intelligent bearing according to claim 5, wherein the first electrodes and the second electrodes are metal electrodes with thickness between 50 nm and 200 nm, thickness of the N-type semiconductor layer and the P-type semiconductor layer is between 600 μm and 1000 μm.

7. The intelligent bearing according to claim 1, wherein a number of friction layers is an integer multiple of a number of conductive layers.

8. The intelligent bearing according to claim 1, further comprising:

a support assembly, the support assembly comprising a support plate and an end cover, wherein the end cover is mounted on a side of the bearing body, fixedly connected to a side wall of the outer ring, and covers a gap between the inner ring and the outer ring; and the support plate is arranged on a side of the end cover facing the conductive layer, and the plurality of friction layers are arranged on the support plate.

9. The intelligent bearing according to claim 8, wherein a positioning ring is provided on a side of the end cover facing the bearing body, the positioning ring and an inner wall of the outer ring are attached by interference fit, and the support plate is arranged on a side of the positioning ring close to an inner edge of the end cover.

10. A method for detecting an operating state of an intelligent bearing, comprising:

using an intelligent bearing comprising a bearing body and a detection component, the bearing body comprising an inner ring, an outer ring, a rolling element and a cage, and the detection component comprising a conductive layer and a plurality of friction layers; wherein the inner ring is rotatably fixed within the outer ring and spaced apart from the outer ring, the cage is rotatably disposed between the inner ring and the outer ring, and the rolling element is rotatably disposed in the cage and located between the inner ring and the outer ring, the plurality of friction layers are arranged at intervals around the intelligent bearing and between the inner ring and the outer ring, and the conductive layer is attached to a first protrusion of the cage protruding towards the plurality of friction layers; wherein when the cage rotates with the rolling element the conductive layer rotates with the cage and generates a direct current by converting mechanical energy of the rolling element into electrical energy when the conductive layer contacts and rubs against the plurality of friction layers;

obtaining a theoretical rotation frequency of the cage based on a specification parameter of the bearing body and a rotation frequency of the inner ring;

obtaining an actual rotation frequency of the cage based on a characteristic frequency of the direct current generated by the detection component; and determining whether the cage is slipping based on the theoretical rotation frequency and the actual rotation frequency of the cage.

11. The method according to claim 10, wherein there are a plurality of conductive layers and a plurality of first protrusions, and the plurality of conductive layers are arranged at intervals from each other and correspond one-to-one to the plurality of first protrusions.

12. The method according to claim 10, wherein the plurality of friction layers comprise N-type semiconductor layers and P-type semiconductor layers that are arranged at intervals, and a Fermi level of the conductive layer is between a Fermi level of a P-type semiconductor layer and a Fermi level of an N-type semiconductor layer.

13. The method according to claim 12, wherein a number of the N-type semiconductor layers is the same as a number of the P-type semiconductor layers.

14. The method according to claim 12, wherein the plurality of friction layers further comprise first electrodes and second electrodes, the first electrodes are arranged on a side of the N-type semiconductor layer away from the conductive layer, the second electrodes are arranged on a side of the P-type semiconductor layer away from the conductive layer, and the first electrodes and the second electrodes are electrically connected to two ends of an external load respectively.

15. The method according to claim 14, wherein the first electrodes and the second electrodes are metal electrodes with thickness between 50 nm and 200 nm, thickness of the N-type semiconductor layer and the P-type semiconductor layer is between 600 μm and 1000 μm.

16. The method according to claim 10, wherein a number of friction layers is an integer multiple of a number of conductive layers.

17. The method according to claim 10, wherein the intelligent bearing further comprises:

a support assembly, the support assembly comprising a support plate and an end cover, wherein the end cover is mounted on a side of the bearing body, fixedly connected to a side wall of the outer ring, and covers a gap between the inner ring and the outer ring; and the support plate is arranged on a side of the end cover facing the conductive layer, and the plurality of friction layers are arranged on the support plate.

18. The method according to claim 17, wherein a positioning ring is provided on a side of the end cover facing the bearing body, the positioning ring and an inner wall of the outer ring are attached by interference fit, and the support plate is arranged on a side of the positioning ring close to an inner edge of the end cover.

19. The method according to claim 10, wherein obtaining the theoretical rotation frequency of the cage based on the specification parameter of the bearing body and the rotation frequency of the inner ring is performed according to a formula of:

$$f_1 = \frac{1}{2} f_0 \left(1 - \frac{d}{D} \cos\alpha\right)$$

where $f_1$ is the theoretical rotation frequency of the cage, $f_0$ is the actual rotation frequency of the inner ring, D is a pitch circle diameter of the bearing body, d is a diameter of the rolling element, and $\alpha$ is a contact angle.

20. The method according to claim 10, wherein obtaining the actual rotation frequency of the cage based on the characteristic frequency of the direct current generated by the detection component is performed according to a formula of:

$$f_v = C \cdot f_2$$

where $f_v$ is the characteristic frequency of the direct current generated by the detection component, C is a number of pairs of P-type semiconductor layers and N-type semiconductor layers, and $f_2$ is the actual rotation frequency of the cage.

* * * * *